(12) United States Patent
Mariotti et al.

(10) Patent No.: US 8,838,600 B2
(45) Date of Patent: Sep. 16, 2014

(54) METHOD FOR DETERMINING CONSTRAINT-BASED RELATIONSHIPS BETWEEN DEVICES FOR INTERACTING AND SHARING INFORMATION

(75) Inventors: Andrea Mariotti, San Carlos, CA (US); Berna Erol, San Jose, CA (US); Michael J. Gormish, Redwood City, CA (US); Gregory J. Wolff, Palo Alto, CA (US)

(73) Assignee: Ricoh Co., Ltd., Tokyo (JP)

( * ) Notice: Subject to any disclaimer, the term of this patent is extended or adjusted under 35 U.S.C. 154(b) by 346 days.

(21) Appl. No.: 13/078,839

(22) Filed: Apr. 1, 2011

(65) Prior Publication Data
US 2012/0254240 A1    Oct. 4, 2012

(51) Int. Cl.
*G06F 17/30* (2006.01)
*H04W 4/20* (2009.01)
*H04W 60/00* (2009.01)

(52) U.S. Cl.
CPC ............ *H04W 4/206* (2013.01); *H04W 60/00* (2013.01)
USPC ...................................................... 707/737

(58) Field of Classification Search
USPC ........................................................ 707/737
See application file for complete search history.

(56) References Cited

U.S. PATENT DOCUMENTS

| | | | |
|---|---|---|---|
| 2010/0029302 A1* | 2/2010 | Lee et al. | 455/456.6 |
| 2011/0184945 A1* | 7/2011 | Das et al. | 707/724 |
| 2011/0238302 A1* | 9/2011 | Lee | 701/207 |
| 2012/0008526 A1* | 1/2012 | Borghei | 370/254 |

* cited by examiner

*Primary Examiner* — Wilson Lee
(74) *Attorney, Agent, or Firm* — Patent Law Works LLP

(57) ABSTRACT

The system includes a registry server and devices. The registry server is coupled to the devices for publishing or registering spots, managing places and authenticating membership and places. The registry server includes a data store for constraint metadata, an authentication module, a spot manager module, a place manager module and a query response module. The devices are adapted to collect field values, create spots, access places, and interact and share information with other spots. In one embodiment, the devices include a constraint collection module, a spot creation module, a query module, a challenge creation module, a presentation module, a challenge response module, a spot action module and a spot communication module. The present invention includes methods for creating a spot, for generating and approving a challenge, for direct communication or sharing of documents, for performing an action based upon information space membership and for searching for available places.

20 Claims, 10 Drawing Sheets

METHOD FOR DETERMINING CONSTRAINT-BASED RELATIONSHIPS BETWEEN DEVICES FOR INTERACTING AND SHARING INFORMATION

BACKGROUND OF THE INVENTION

1. Field of the Invention

The present invention relates to computing devices and electronic communication; and in particular, a system and method for determining constraint-based relationships between devices for interacting and sharing information.

2. Description of the Background Art

The use of portable computing devices has become commonplace for many users. In addition to having a conventional desktop computer, many users also have some type of portable computing device. Examples of present-day computing devices include tablet computers such as the iPad from Apple Computer Inc., and a plethora of smart phones including the iPhone from Apple Computer Inc., the Blackberry from Research In Motion and the Pre from Palm just to name a few. Mobile computing is on the rise and predicted to increase by more than 20% in the coming years. Moreover, there is been a convergence of mobile technologies that are often built into portable computing devices such as a variety of communication mechanisms or channels, location systems like GPS, accelerometers, gyroscopes, cameras, microphones, etc.

One particular problem with such prior devices is that it is often difficult for such devices to find each other, interact with each other, and share relevant information with each other. For example, most all current communication between devices needs to be sent from the device to a central server to the other device. This reliance on centralized servers for processing information creates bottlenecks. Because of this construct, there are a number of barriers that prevent simple and easy sharing of documents and interaction with other portable communication devices. One barrier is that the devices consume bandwidth connecting with a network or central server. Another barrier is that the devices must know an identification number or some other information to establish a connection with the other device. Other barriers for simple and easy interaction and communication include small screen sizes of the portable devices, the difficulty of entering data on portable devices, and privacy considerations.

SUMMARY OF THE INVENTION

The present invention overcomes the deficiencies and limitations of the prior art by providing a system and method for determining constraint-based relationships between devices for interacting and sharing information. The present invention creates one or more information spaces including one or more of a place, a spot and a region. The devices can act as members of one or more information spaces. As a member of an information space, a device can search, access, tag, view, and modify information within that space.

The system includes a constraint-based registry server and a plurality of devices. The constraint-based registry server is coupled to the plurality of devices for publishing or registering spots, managing places and authenticating membership and places. In one embodiment, the constraint-based registry server includes a data store for constraint metadata, an authentication module, a spot manager module, a place manager module and a query response module. The devices are adapted to collect field values, create spots, access places, and interact and share information with other spots. In one embodiment, the devices include a constraint collection module, a spot creation module, a query module, a challenge creation module, a presentation module, a challenge response module, a spot action module and a spot communication module.

The present invention also includes a number of novel methods including a method for creating a spot, a method for generating and approving a challenge, a method for direct communication or sharing of documents, a method for performing an action based upon information space membership and a method for searching for available places.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
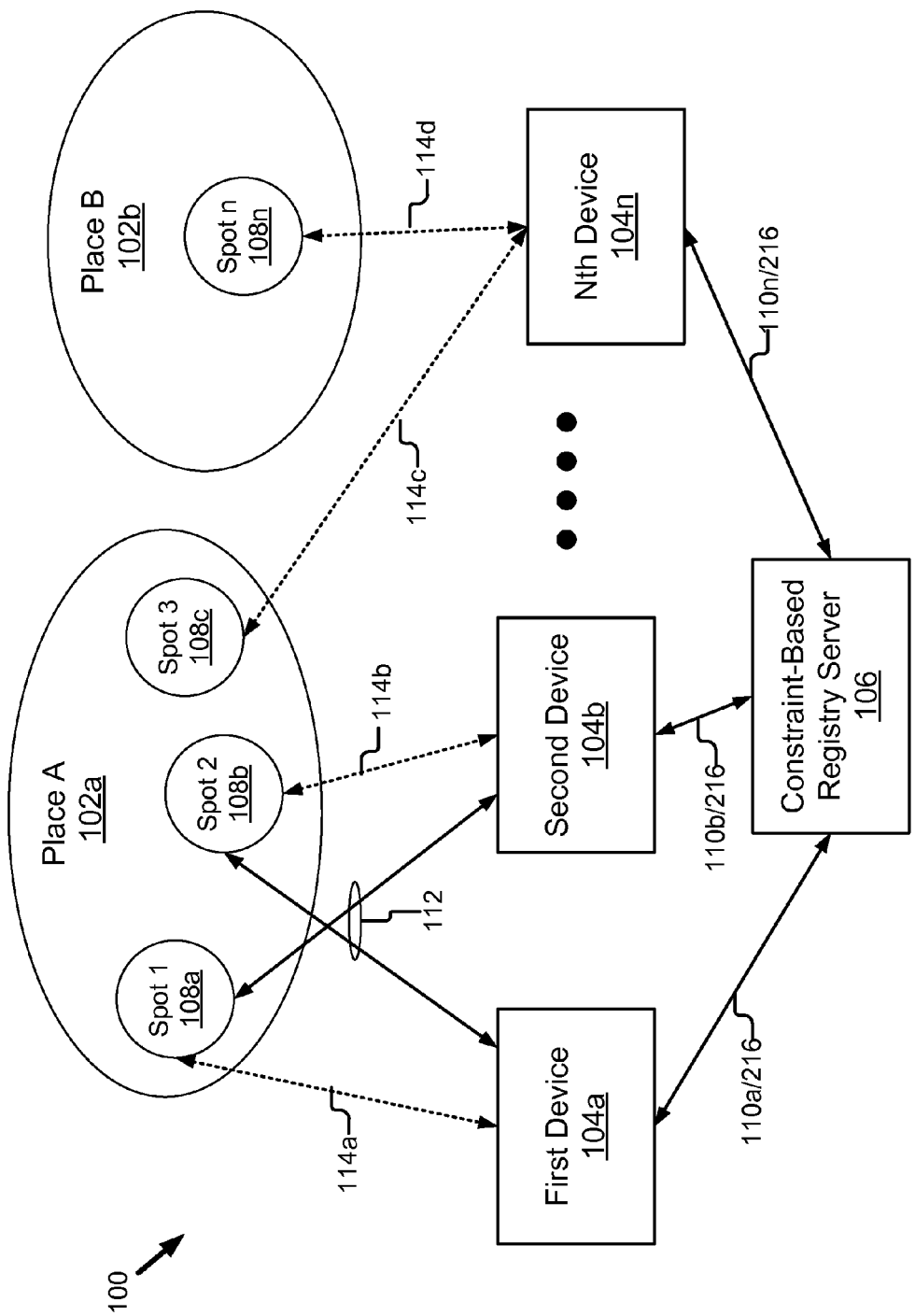
FIG. 1 is a conceptual block diagram of information spaces such as places and spots and their relationship to devices and a constraint-based registry server in accordance with the present invention.

A system for determining constraint-based relationships between devices for interacting and sharing information is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to portable computing devices such as tablet computers. However, the present invention applies to any type of portable computing device that can capture data, commands, and other factors.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

System Overview

FIG. 1 shows a conceptual block diagram of information spaces such as places 102 and spots 108 and their relationship to devices 104 and a constraint-based registry server 106 in accordance with the present invention. The present invention creates one or more information spaces including one or more of a place 102, a spot 108 and a region. The devices 104 can act as members of these one or more information spaces. As a member of an information space, a device 104 can search, access, tag, view, and modify information within that space and also communicate with other devices in that place.

As shown in FIG. 1, this embodiment of the system 100 includes a plurality of computing devices 104a-104n. The precise configuration and additional detail about these devices 104a-104n is described below with reference to FIGS. 2 and 3. Each of the devices 104a, 104b and 104n is coupled for communication with the constraint-based registry server 106 by signal lines 110a, 110b, 110c, respectively. The constraint-based registry server 106 is described in more detail below with reference to FIGS. 2 and 4.

In this example, two information spaces, Place A 102a and Place B 102b, have been created. Additionally, each of the devices 104a, 104b, and 104n has one or more associated or corresponding 114a, 114b, 114c and 114n spot, Spot 1 108a, Spot 2 108b, Spot 3 108c and Spot n 108n, respectively. As can be seen, Spot n 108n is in or has membership in Place B 102b. Spot 1 108a, Spot 2 108b and Spot 3 108c are in Place A 102a. Since Spot 1 108a and Spot 2 108b are both members of Place A 102a, their corresponding devices 104a, 104b are able to communicate with each other directly as represented by signal lines 112 by virtue of their membership in the same place. It should be recognized that device 104n can establish a similar direct communication path although not show in FIG. 1. More particularly, the second device 104b accesses Spot 1 108a (an endpoint) defined by device 104a. Similarly, the first device 104a accesses Spot 2 108b (an endpoint) defined by device 104b.

For the present disclosure, a "spot" 108 corresponds to exactly one device endpoint which accepts and responds to requests. The spot 108 must respond to requests (from other spots 108 and possibly from the constraint-based registry server 106) on the endpoint. It should be noted that the endpoint does not physically have to be connected to a device 104. The device 104 that satisfies the constraints/challenge and initiates requests to other spots may designate an endpoint which is physically served by another device. This can be considered a proxy which is especially useful for devices that cannot themselves listen for or accept requests. In some by not all embodiments, each spot 108 may have an ID other than the communication endpoint. If the constraint-based registry server 106 assigns each spot an identifier and then that spot uses that identifier in requests to other spots. To define a spot 108, a device 104 specifies a communication endpoint that accepts and responds to requests from other spots in the place. In one embodiment, this is a URL unique to this spot (e.g. http://my.phone.mobi/Place32/Spot16 which might correspond to a web server running physically on the device). Alternative embodiments include a phone number plus keyword code for SMS messaging (and others). To publish or register the spot 108, the device 104 sends the Place Key and this endpoint along with any descriptive information to the constraint-based registry server 106. The spot 108 may also send this information to any other registered spots in the place (using their endpoints).

In the present invention, a "place" 102 corresponds to a (dynamically changing) list of spots 108 for which the corresponding devices satisfy a set of constraints defined for the place. This list is maintained by the constraint-based registry server 106 which accepts requests from spots 108 that satisfy the place conditions for addition to the list. Places are defined based on the constraints not only limited spatial location. Places are dynamically created, terminated and they can overlap in time and space. Updates to the constraints may be sent at any time by defining a new set of constraints, signing them, and communicating them to the constraint-based registry server 106. These requests from spots 108 may require an authentication token associated with the place 102. This token might be a "Place Key" or, more likely, it is a token generated by using the "Place Key" to sign some or all of the parameters included in the request. Note that individual devices/spots might also have and exchange public keys e.g. to encrypt their communication. The place 102 may also have an ID associated with the place 102. This ID is unique to the place and may be used for communications with the constraint-based registry server 106 and/or incorporated into the endpoints corresponding to spots 108. In certain embodiments below, Place Key includes both a Place ID and a cryptographic key.

A place 102 is defined by specifying the set of constraints. In one embodiment, the constraints are represented as [field, relation, value] tuples combined via logical operators. For example:
[latitude, near, 37.4611] AND
[longitude, near, −122.115] AND
[time, near, 8 AM] AND
[person, near, John Smith]

Fields may include a set of standard measures such as latitude, longitude, time, as well as sensory measures such as ambient light level, station ID's (SSID) for visible WIFI points audio signals, and custom defined fields that might include things such as email domains, secret words, the result of a computation test (e.g. testing for the existence of a file on the device), or testing for presence of other devices (which also may indicate presence of specific people).

Relations include the typical set of operators (equality, less than, greater than, etc) along with an extensible set of more complex relations that may be specific to particular data types. Examples of complex relations include "near" (for spatial locations), "similar" (for ambient measures such as light levels), and "likely" (for probabilistic measures). It should be understood that the operators such as "near," "similar," or "likely" may have default definitions with predefined definitions. For example, near may be within a predefined distance such as 3 feet, or similar may have a predefined temperature and lumen range, and likely can be a predefined percentages such as greater than 75%.

Along with the set of constraints, a unique "Place Key" is generated that is specific to this place. In one embodiment, the Place Key is the public part of a public/secret key pair. The secret key, which usually remains secret to the device or entity defining the place, is used to create a signature on the set of constraints. The set of constraints along with the Place Key, signature, and any descriptive information is then communicated to the constraint-based registry server 106.

Any device 104 matching the set of constraints for a place 102 may choose to publish or register as a spot 108 in that place 102. Typically, for example, the device 104 used to define a place 102 would be the first spot 108 in that place 102 (In reality, the constraints may just be used to find a list of potential Place Keys—at the most basic level once you know the Place Key, you can join a place—so long as you can satisfy the registry and/or other devices in the Place that you meet the constraints which might include "place based challenge and responses".)

A pin is defined as a tuple containing a URL, description information, the originating spot, etc. It should be understood that a pin is one type of information that can be sent by spots—e.g., in one embodiment a request from a device 104 to a spot 108 returns a list of pins.

A place is defined as a collection of spots 108 subject to constraint value pairs matching specific ranges and an identifier called a Place Key. Each Place may be associated with one or more Regions. Each device may also be associated with one or more Regions. For example, a Region might correspond to all of the devices used by the employees of a corporation and the set of Places created by those employees. In one embodiment, Regions are specified by a Region Key. When creating a Place with the constraint-based registry server 106, a device may specify that the place be associated with a specific Region by providing the appropriate identifier (Region Key) and credentials for the Region. Regions allow sets of devices 104 to be maintained under a common management policy, such as authentication and auditing requirements. The constraint-based registry server 106 may use device membership in a Region as one of the constraints corresponding one or more places. (In other words, the devices would need to "be in" the region in order to join the place. For example, they might all need email addresses with the same domain.) Regions may be defined simply as a set of device identifiers and associated private keys or the set of devices holding specific credentials, such as the private key for a Region. Alternatively, Regions may be defined by a more open set of constraints, similar to places. To satisfy the constraints for a Place associated with a Region, a device may need to provide all the key, value pairs required to satisfy the Region constraints in addition to the other constraints defined by a Place. Updates to the Region constraints would also apply to the places within that Region. In this way, the manager of a region (e.g. a company) can also manage all of the places within that region.

Figure 2:
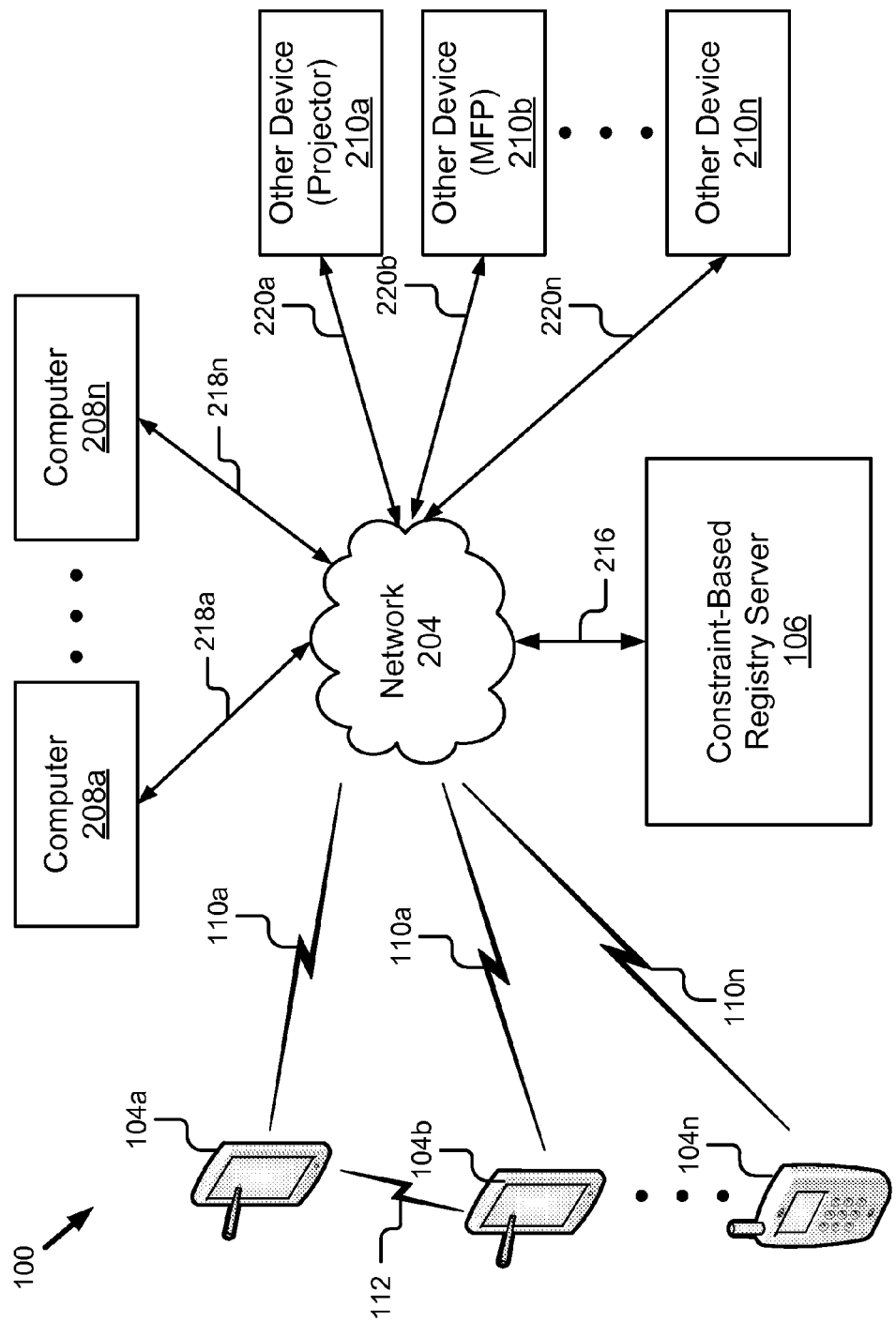
FIG. 2 is a block diagram of an embodiment of the system for determining constraint-based relationships between devices for interacting and sharing information in accordance with the present invention.

FIG. 2 is a block diagram of an embodiment of the system 100 for determining constraint-based relationships between devices 104, 208 and 210 for interacting and sharing information in accordance with the present invention. This embodiment of system 100 comprises: a plurality of portable computing devices 104a-104n, a network 204, a plurality of computers 208a-208n, the constraint-based registry server 106 and a plurality of other devices 210a-210n.

The portable computing devices 104a-104n are wirelessly coupled to the network 204 via respective couplings 110a-110n. In one embodiment, the portable computing devices 104a-104n are portable computing devices including audio, video and text input and output capability and a wireless communication capability. The portable computing devices 104a-104n are adapted to receive and display images; receive audio, video and text; send audio, video and text; capture audio, video and text; determine location; and various other operations. Example portable computing devices 104a-104n include smart phones and tablets. The functionality of the portable computing devices 104a-104n will be described in more detail below with reference to FIG. 3. The portable computing devices 104a-104n also have a capability to communicate with each other directly as represented by signal line 112 in FIG. 2. This communication may be by WIFI, IR, or other communication mechanism through network 204 or another network like a cellular or data network.

The network 204 is a conventional type, wired or wireless, and may have any number of configurations such as a star configuration, token ring configuration or other configurations known to those skilled in the art. Furthermore, the network 204 may comprise a local area network (LAN), a wide area network (WAN) (e.g., the Internet), and/or any other interconnected data path across which multiple devices may communicate. In yet another embodiment, the network 204 may be a peer-to-peer network. The network 204 may also be coupled to or includes portions of a telecommunications network for sending data in a variety of different communication protocols. In yet another embodiment, the network 204 includes Bluetooth communication networks or a cellular communications network for sending and receiving data such as via short messaging service (SMS), multimedia messaging service (MMS), hypertext transfer protocol (HTTP), direct data connection, WAP, email, etc.

The plurality of computers 208a-208n is a conventional type such as personal computer or hardware server. The computers 208a-208n are coupled to the network 204 by signal lines 118a-n. In one embodiment, the computer 208a-208n can access and communicate with the constraint-based registry server 106 to create spots and access places. The computer 208a-208n may communicate, interact and exchange information with the portable computing devices 104 and other devices 210 when a member of a places. The plurality of computers 208a-208n are able to perform the same or similar operations as the portable computing devices 104, and those skilled in the art will recognize that while the present invention will be primarily described below in the context of portable computing devices 104, the functionality can be performed similarly by the plurality of computers 208a-208n.

The constraint-based registry server 106 is coupled to the network 204 via signal line 216 for communication with the portable computing devices 102a-102n, the computers 208a-208n and the other devices 210a.-210n. The constraint-based registry server 106 publishes or registers spots, manages places and authenticates membership and places. The constraint-based registry server 106 will be described in more detail below with reference to FIG. 4. The constraint-based registry server 106 is particularly advantageous because it allows ad hoc creation of places and automatically handles membership to places for spots, thereby allowing the devices associated with the spots to share information and interact with each other as well as the information space.

Although the system of FIG. 1 shows only one constraint-based registry server 106, it should be understood that there could be any number of additional constraint-based registry servers 106, for example dedicated to other functions, companies, institutions, organizational structures or geographic areas. A portable computing device 102 may communicate with more than one constraint-based registry server 106.

The plurality of other devices 210a-210n are coupled to the network 204 by respective signal lines 220a-220n. The plurality of other devices 210a-210n are various other types of conventional systems that also include the present invention. For example, the other devices 210a-210n can be a digital projector, a multi-function printer, a photocopier, and a wireless access point, a router, or other device that has been enhanced to include the present invention. In addition to performing their conventional function, these other devices 210a-210n are augmented to be able to create spots, access or create places, and perform other operations similar to those that will be described below with reference to the portable computing devices 104a-104n. Those skilled in the art will recognize that the present invention can be added to virtually any other device that includes a processor, memory and a data storage.

Portable Computing Device 104

Figure 3:
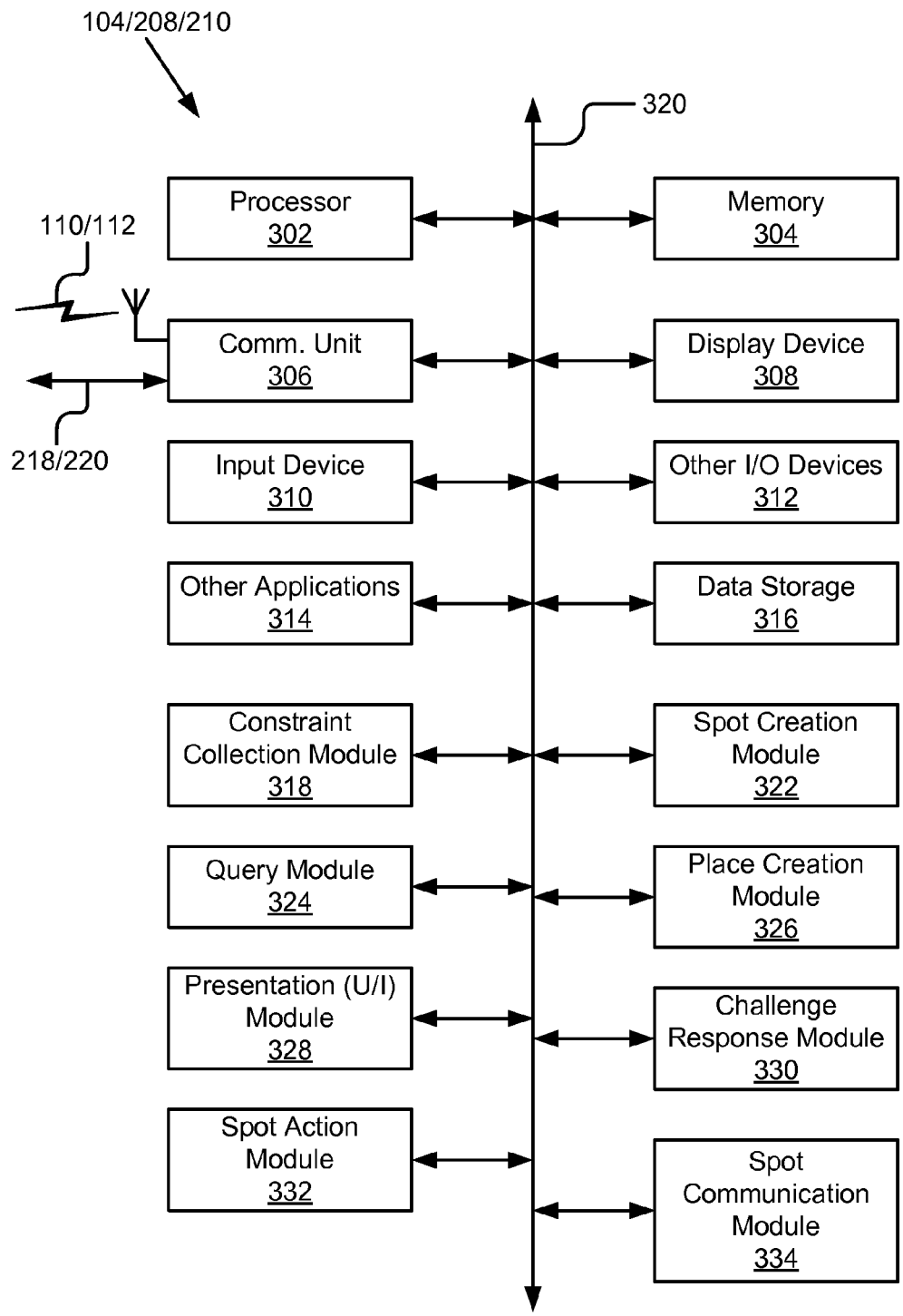
FIG. 3 is a block diagram of the embodiment of a portable computing device in accordance with the present invention.

Referring now to FIG. 3, an embodiment of the portable computing device 104 in accordance with the present invention will be described in more detail. While the description below describes the functionality of the portable computing device 104, those skilled in the art will recognize that the computers 208 and the other devices 210 have the same or similar functionality to that described below for the portable computing device 104 as related to the present invention, but may also have more or less functionality than that described below with reference to FIG. 3.

The portable computing device 104 includes a processor 302, a memory 304, a communication unit 306, a display 308, an input device 310, other input/output (I/O) devices 312, other applications 314, a data storage 316, a constraint collection module 318, a spot creation module 322, a query module 324, a challenge creation module 326, a presentation (U/I) module 328, a challenge response module 330, a spot action module 332, and a spot communication module 334. These components are coupled to each other by a system bus 320.

The processor 302 comprises an arithmetic logic unit, a microprocessor, a general purpose controller or some other processor array to perform computations, provide electronic display signals to display device 308, and receive inputs from the input device 310 and process signals from the other I/O devices 312. The processor 302 is coupled to the bus 320 for communication with the other components of the portable computing device 104. Processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. It will be obvious to one skilled in the art that other processors, operating systems, sensors, displays and physical configurations are possible. The portable computing device 104 also includes an operating system executable by the processor 302 such as but not limited to WINDOWS®, MacOS X, Android, or UNIX® based operating systems.

The memory 304 stores instructions and/or data that may be executed by processor 302. The instructions and/or data may comprise code for performing any and/or all of the techniques described herein. The memory 304 may be a dynamic random access memory (DRAM) device, a static random access memory (SRAM) device, flash memory or some other memory device known in the art. In one embodiment, the memory 304 also includes a non-volatile memory such as a hard disk drive or flash drive for storing log information on a more permanent basis. The memory 304 is coupled by the bus 320 for communication with the other components of portable computing device 104.

The communication unit 306 is coupled to an antenna and the bus 320. The antenna provides a wireless coupling to the network represented by signal line 110 and 112. An alternate embodiment, the communication unit 306 may provide a port for direct physical connection to the network 204 via signal line 218 or 220. The communication unit 306 includes a transceiver for sending and receiving compound documents. In one embodiment, the communication unit 306 includes a WIFI transceiver for wireless communication with an access point. In another embodiment, the communication unit 306 includes a Bluetooth® transceiver for wireless communication with other devices. In yet another embodiment, the communication unit 306 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 306 includes ports for wired connectivity such as but not limited to USB, SD, or CAT-5, etc. The communication unit 306 links the processor 302 to the network 204 that may include multiple processing systems. The network of processing systems may comprise a local area network (LAN), a wide area network (WAN) (e.g., the Internet), and/or any other interconnected data path across which multiple devices may communicate. The communication unit 306 also provides other conventional connections to the network 204 for distribution of files (media objects) using standard network protocols such as TCP/IP, HTTP, HTTPS and SMTP as will be understood to those skilled in the art.

The display device 308 is a liquid crystal display (LCD) or any other similarly equipped display device, screen or monitor. The display device 308 represents any device equipped to display electronic images and data as described herein. The display device 308 is sized sufficient to show at least a small 'page' of information. In different embodiments, the display device 308 is binary (only two different values for pixels), monochrome (multiple shades of one color), or allows multiple colors and shades.

In one embodiment, the input device 310 is a touch screen, keyboard, keypad or input buttons. The touch screen can be any conventional touch screen, sensors, digitizing tablet or graphics pad. The keyboard can be a QWERTY keyboard, a key pad, or representations of such created on a touch screen. The input device 310 includes cursor control to communicate positional data as well as command selections to processor 302. Cursor control may include a mouse, a trackball, a stylus, a pen, a touch screen, cursor direction keys or other mechanisms to cause movement of a cursor.

The portable computing device 104 may include one or more other input/output (I/O) devices 312. For example, the other I/O devices 312 may include speakers to produce sound, microphones to record sound, a scanner or camera to record videos or images, and other sensors for light, temperature or other conditions or feedback devices like accelerometers, pager motors or haptic feedback, and GPS systems for location determination. The camera is a conventional type such as those available on cell phones or notebook computers. Optionally, the other I/O devices 312 may include one or more analog-to-digital or digital-to-analog converters, and/or one or more digital signal processors to facilitate audio processing. These other I/O devices 312 are coupled by bus 320 for communication with the processor 302 and the memory 304. Optionally, a microcontroller may be added as part of other I/O devices 312 to facilitate power systems control, as well as off-load the main processor 302 from lower-speed lesser-important tasks.

The other applications 314 include other software and routines executable by the processor 302 for various other types of functionality. In one embodiment, one or more application programs are executed by the processor 302 including, without limitation, word processing applications, electronic mail applications, financial applications, and web browser applications.

The data storage 316 is coupled to the other components of the portable computing device 104 by the bus 320. The data storage 316 is a non-volatile memory device or similar permanent storage device and media. Data storage device 316 stores data and instructions for processor 302 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 316 is used to store information about spots and places.

The constraint collection module 318 is software or routines for collecting, recording and storing information from the input device 310, the other I/O devices 312, the communication unit 306, or other modules of the portable computing device 104. The constraint collection module 318 is coupled to the components to collect the sensory measures, location measures or other standard measures that are used as constraints in defining spots and places. Those skilled in the art will recognize that the constraint collection module 318 can collect any number of constraints from one to n. The other modules of the portable computing device 104 can then use one or more of the constraints to create constraint-based requirements of varying degree. In one embodiment, the constraint collection module 318 collects field values from the other components of the portable computing device 104 and then outputs field value pairs. The output of the constraint collection module 318 is coupled to provide information to the spot creation module 322, the challenge creation module 326, and the challenge response module.

The bus 320 represents a shared bus for communicating information and data throughout portable computing device 104. The bus 320 may represent one or more buses including an industry standard architecture (ISA) bus, a peripheral component interconnect (PCI) bus, a universal serial bus (USB), or some other bus known in the art to provide similar functionality. The components coupled to processor 302 through system bus 320 include the memory 304, the communication unit 306, the display 308, the input device 310, the other input/output (I/O) devices 312, the other applications 314, the data store 316, the constraint collection module 318, the spot creation module 322, the query module 324, the challenge creation module 326, the presentation (U/I) module 328, the challenge response module 330, the spot action module 332, and the spot communication module 334. There may also be a plurality of busses in computing system 202, designed to provide the most efficient communications between functional elements.

The spot creation module 322 is software or routines for creating a spot. In another embodiment, the place creation module 326 (See below) creates spots in a manner similar to the spot creation module 322. The operation of the spot creation module 322 is described in more detail below with reference to FIG. 5. The spot creation module 322 receives field values from the constraint collection module 318, identifies a communication endpoint, and creates a spot from that information. The spot creation module 322 also interacts with the constraint-based registry server 106 to publish or register a created spot. In one embodiment, the spot creation module 322 also provides spot information to the spot action module 332 and the spot communication module 334 when the portable computing device 104 is interacting directly with another portable computing device 104. The spot creation module 322 is coupled to bus 320 to send and receive the above information to the other modules of the portable computing device 104. In alternate embodiments, the spot creation module 322 and the spot communication module 334 are optional, and the device 104 uses the spot creation module 322 and the spot communication module 334 on another, "proxy" device which would respond to requests on behalf of the device 104. For example, a mobile device may use the spot creation module 322 and the spot communication module 334 of another device. In such a case, device 104 would use an alternate communication channel to send information such as the Place Key or challenge response values to the associated "proxy" device to allow the proxy to respond properly on behalf of device 104.

The query module 324 is software or routines for sending a request for available places to the constraint-based registry server 106 and receiving the list of available places. The operation of the query module 324 is described in more detail below with reference to FIG. 9. The query module 324 communicates with the constraint collection module 324 to retrieve constraints and with the spot creation module 322 to receive spot information. The query module 324 sends that information to the constraint-based registry server 104 via the communication unit 306. The constraint-based registry server 106 responds with information about available places, if there are any. The query module 324 receives this information and provides it to the presentation module 328 for display to the user. The query module 324 is coupled to the bus 322 communicate with these other units of the portable computing device 104.

The place creation module 326 is software or routines for creating a place and a challenge and sending information related to that place and challenge to the constraint-based registry server 106 when a new place is created. In one embodiment, the place creation module 326 also creates and stores a private key that is used to communicate with the constraint-based registry server 106 to update the Place. This information will be used by the constraint-based registry server 106 to deny or allow access to the created space. For example, the place creation module 326 interacts with the user via the presentation module 328 to determine which constraints should be used when a place is created. The challenge creation module 324 can also require that other information such as a password, encryption keys or other authentication levels be required as part of the challenge. The place creation module 326 also includes the ability to define and update the constraints and challenges for the Place. The place creation module 326 is coupled to the communication unit 306 to send and receive information from the constraint-based registry server 106. The place creation module 326 is also coupled to the data storage 316, the processor 302, and the constraint collection module 318. In certain embodiments, the place creation module 326 also is capable of creating spots. In yet other embodiments, the place creation module 326 is part of the constraint-based registry server 106.

The presentation (U/I) module 328 is software and routines for displaying information related to constraints, spots, places and challenges on the display device 308. The presentation module 328 is responsive to input from many of the other components of the portable computing device 104 to present information and accept input from the user related to operations of the present invention. For example, the presentation module 328 shows the users constraints for a given time or location, available spaces to which the portable computing device 104 can access, challenge information required to enter a space, etc. In one embodiment, the presentation module 328 is a thin client routine executable by the processor 302 to cause display of information on the display device 206. The presentation module 328 is coupled by the bus 320 to the display device 308, the processor 302, and the memory 304.

The challenge response module 330 is software or routines for responding to a challenge required to enter a place or register for membership in a place received from the constraint-based registry server 106. The operation of the challenge response module is described below in more detail with reference to FIGS. 6A and 6B. The challenge response module 330 communicates with the constraint-based registry server 106 and receives the challenge. The count response module 330 retrieves constraint from the constraint collection module 318 and also user input from the presentation module 328 and then generates and sends a challenge response back to the constraint-based registry server 106. The challenge response module 330 is coupled by the bus 320 to these other components into the communication unit 306 to perform these operations.

The spot action module 332 is software and routines for performing actions based upon requests or the presence of other spots in a space. One embodiment of the operation of the spot action module 322 is described below with reference to FIG. 8. The spot action module 332 interacts with a corresponding module of another portable computing device 104, computer 208 or other device 210. The spot action module 332 allows the portable communication device 104 to perform an action and response request from another spot/device. The spot action module 332 is coupled to receive and send information from and to the communication unit 306.

The spot communication module 334 is software and routines for managing communications between another spot in a space in which the portable communication device is in. The spot communication module 334 manages communication and exchange of information and documents between two spots in a place. One embodiment of the operation of the spot communication module 334 is described below with reference to FIG. 7. The spot communication module 334 is coupled to the processor 302, the memory 304, the data store 316 and the communication unit 306 to send and receive documents and information.

Those skilled in the art will recognize that in other embodiments, one or more of the constraint collection module 318, the spot creation module 322, the query module 324, the challenge creation module 326, the presentation (U/I) module 328, the challenge response module 330, the spot action module 332, and the spot communication module 334 store data that, when executed by the processor 302, causes the modules to perform the operations described below. In yet another embodiment, one or more of the constraint collection module 318, the spot creation module 322, the query module 324, the challenge creation module 326, the presentation (U/I) module 328, the challenge response module 330, the spot action module 332, and the spot communication module 334 are instructions executable by the processor 302 to provide the functionality described below with reference to FIGS. 5-9. In still another embodiment, one or more of the constraint collection module 318, the spot creation module 322, the query module 324, the challenge creation module 326, the presentation (U/I) module 328, the challenge response module 330, the spot action module 332, and the spot communication module 334 are stored in the memory 304 and are accessible and executable by the processor 302.

Constraint-Based Registry Server 106

Figure 4:
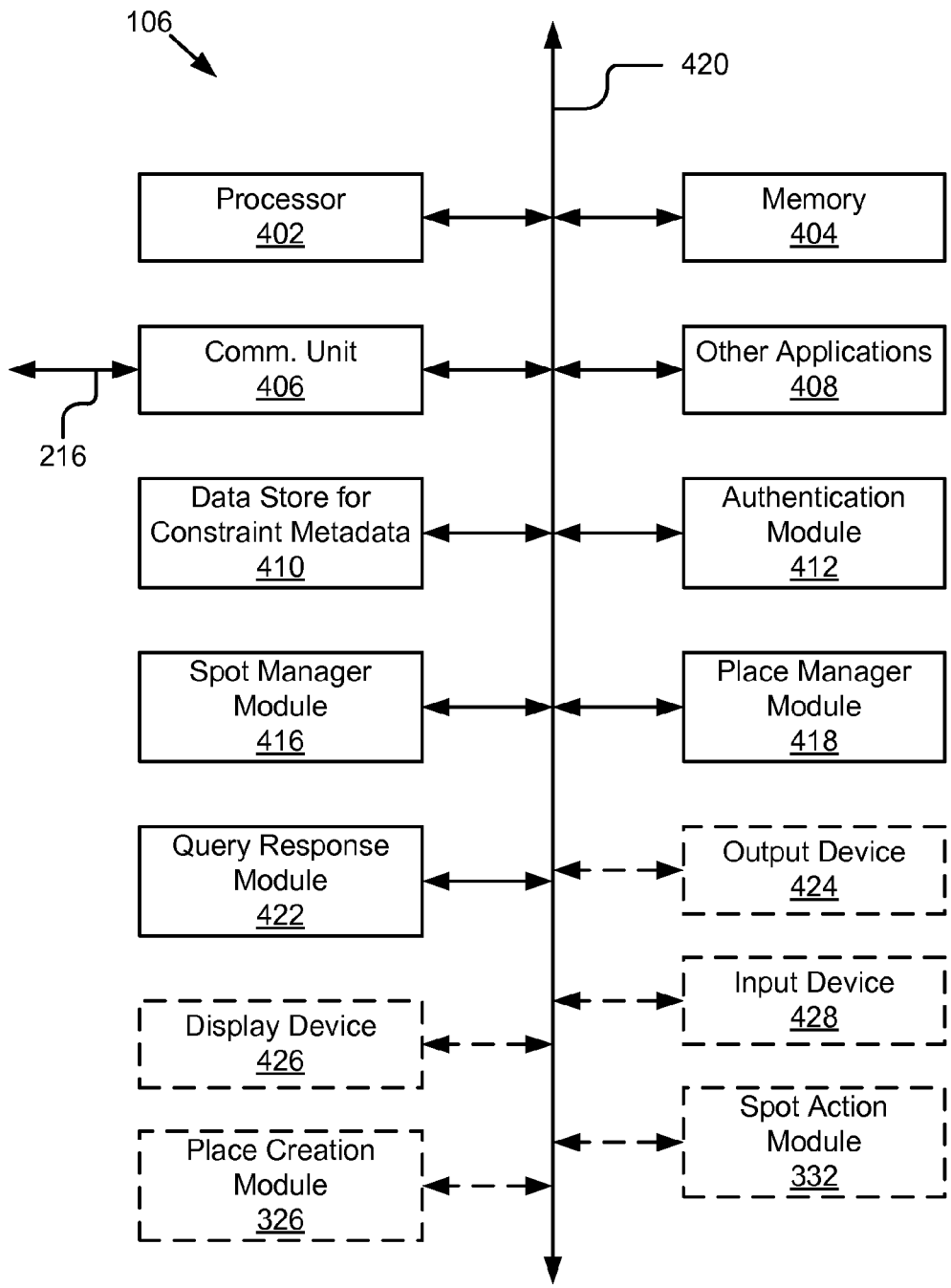
FIG. 4 is a block diagram of an embodiment of the constraint-based registry server in accordance with the present invention.

Referring now to FIG. 4, an embodiment of the constraint-based registry server 106 will be described in more detail. The constraint-based registry server 106 comprises a processor 402, a memory 404, a communication unit 406, other applications 408, a data store for constraint metadata 410, an authentication module 412, a spot manager module 416, a place manager module 418, and a query response module 422. In an alternate embodiment, the constraint-based registry server 106 optionally further comprises an output device 424, a display device 426, an input device 428, and a spot action module 332. These modules are coupled to each other for communication by bus 420.

Those skilled in the art will recognize that some of the components of the constraint-based registry server 106 have the same or similar functionality to the components of portable computing device 104 so descriptions of these components will not be repeated here. For example, the processor 402, the memory, 404, the communication unit 406, the other applications 408, the data store 410, the bus 420, the output device 424, the display device 426, the input device 428 and the spot action module 332 have a similar functionality to the processor 302, the memory 304, the communication unit 306, other applications 314, the data store 316, the bus 320, the other I/O devices 312, display device 308, the input device 310, and the spot action module 332 of FIG. 3, respectively. Some differences between the components of the constraint-based registry server 106 and portable computing device 104 are noted below. For example, the communication unit 406 may couple the constraint-based registry server 106 to the network 204 in a wired manner instead of wirelessly. The processor 402 is more computationally powerful than the processor 302 as the constraint-based registry server 106 likely services numerous portable computing devices 104. The display device 422 may be a CRT, and the output device 424 may be speakers. The input device 428 includes a keyboard and mouse type controller. The data store 410 stores constraint meta data related the spots, places and regions registered with the constraint-based registry server 106. Those skilled in the art will recognize that there may be a variety of other differences as the components of the constraint-based registry server 106 acts as a hardware server as opposed to a remote client.

The authentication module 412 is software and routines for publishing or registering a spot with the constraint-based registry server 106. The authentication module 412 is coupled to the communication unit 406 to receive spot, endpoint and field value pairs from a device 104. The authentication module 412 registers the spot, and if appropriate, sends a Place Key in response. The authentication module 412 is coupled to the place manager module 418 to receive Place Key information. The operation of the authentication module 412 is described in more detail below with reference to FIG. 5. The authentication module also stores a registered spot in the data store 410. The authentication module 412 is coupled by the bus 420 to the other components of the constraint-based registry server.

The spot manager module 416 is software and routines for responding to requests for lists of spots for place. The spot manager module 416 is coupled to the place manager module 418 to determine the constraints associated with each place and the matching registered spots. The operation of the spot manager 416 is described in more detail below with reference to FIG. 6B. The spot manager 416 is coupled to the data store 410 to retrieve spot information for comparison two places as well as delivery of spot information responsive to requests. The spot manager module 416 is coupled by the bus to the other components of the constraint-based registry server 106.

The authentication module 412 is software and routines for registering a spot with the constraint-based registry server 106. The authentication module 412 is coupled to the communication unit 406 to receive spot, endpoint and field value pairs from a device 104. Registers the spot, and if appropriate, sends a Place Key in response. The authentication module 412 is coupled to the place manager module 418 to receive Place Key information. The operation of the authentication module 412 is described in more detail below with reference to FIG. 5. The authentication module 42 is coupled by the bus 420 to the other components of the constraint-based registry server.

The place manager module 418 is software and routines for providing place information in response to device requests. The place manager module 418 is coupled to the data store 410, and maintains a registry of places and their associated constraints in the data store 410. The place manager module 418 manages the identity nature of places by automatically creating and removing places depending upon the registered spots that correspond to a place. Some places are fixed in that they are maintained whether or not a spot is present within the place. Other places are dynamic in that they are created automatically as multiple spots have overlapping constraints. Furthermore, in certain embodiments the place manager module 418 intermittently or on a regular schedule regenerates Place Keys and sends the Place Keys out to the devices that continue to satisfy the constraints for a given space. The operation of the place manager module 418 is described in more detail below with reference to FIGS. 6A and 6B. The place manager 418 also provides place information to the spot manager module 416 and the query response module 422. The place manager module 418 is coupled by the bus 420 to the other components of the constraint-based registry server 106.

The query response module 422 is software and routines for responding to a query from a device 104 for a list of available places. The query response module 422 is coupled for communication with the devices by the communication unit 406. The query response module 422 receives field value pairs from the devices 104 and in response sends a list of places that match the field value pairs. The query response module 422 is coupled to the place manager module 418 to obtain a list of available places. The operation of the query response module 422 is described in more detail below with reference to FIG. 9.

Those skilled in the art will recognize that in other embodiments, one or more of the authentication module 412, the spot manager module 416, the place manager module 418, and the query response module 422 store data that, when executed by the processor 302, causes the modules to perform the operations described below. In yet another embodiment, one or more of one or more of the authentication module 412, the spot manager module 416, the place manager module 418, and the query response module 422 are instructions executable by the processor 302 to provide the functionality described below with reference to FIGS. 5-9. In still another embodiment, one or more of one or more of the authentication module 412, the spot manager module 416, the place manager module 418, and the query response module 422 are stored in the memory 304 and are accessible and executable by the processor 302.

Methods

Referring now to FIGS. 5-9, the methods of the present invention will be described in more detail.

Figure 5:
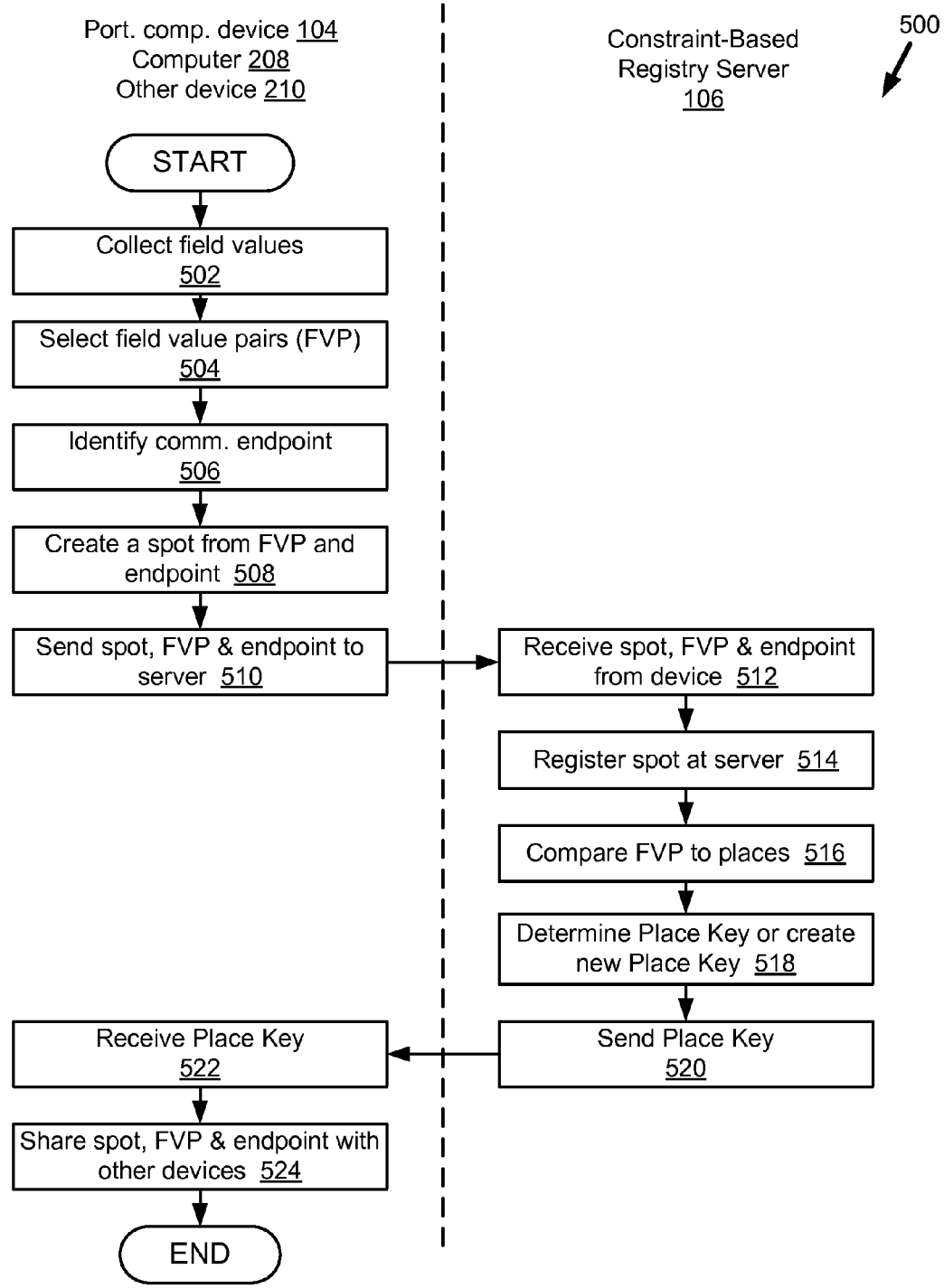
FIG. 5 is a flow chart of a method for creating a spot in accordance with the present invention.

Referring now to FIG. 5, one embodiment of a method 500 for creating a spot in accordance with the present invention will be described. The method begins by collecting 502 field values such as with the constraint collection module 318 of the device 104. Next the method continues by selecting 504 one or more field value pairs. For example, the spot creation module 322 may automatically select a set of standard field value pairs. In another embodiment, a default set of field value pairs are selected. In yet another embodiment, options for field value pairs are presented for selection by the user using the presentation module 328. Once the field value pairs have been selected, the spot creation module 322 identifies 506 a communication endpoint. Then the spot creation module 322 creates 508 a spot from the field value pairs and the endpoint. In one embodiment, the information about the spot is stored in the data storage 316 of the device 104. The spot may also be given an identification number or name. Next, the device 104 sends 510 the spot, the field value pairs and the endpoint to the constraint-based registry server 106. This information is received 512 by the constraint-based registry server 106. The method continues with the authentication module 412 of the constraint-based registry server 106 registering 514 the spot. In one embodiment, the information for the spot is stored in the data store 410 for constraint metadata. The authentication module 412 then compares the received field value pairs to existing places. The authentication module 412 determines 518 whether there is an existing Place Key or whether a new Place Key needs to be created. In one embodiment, the constraint-based registry server 106 maintains a list of places and associated constraints in the data store 410 for constraint metadata. In one embodiment, the constraint-based registry server 106 creates a new place if there are no existing places that match the constraints received in step 512. If there is only one place with matching constraints, the place key for that place is selected. In another embodiment where there are multiple places that with matching constraints, the constraint-based registry server 106 communicates with the device 104, 208, 210, and received input as to which place in which to create a spot. Regardless of which embodiment, the spot and endpoint are added to by the constraint-based registry server 106 to the place in the data store 410 for constraint metadata. In any event, a Place Key is identified and sent 520 by the constraint-based registry server 106 to the device 104. The device 104 receives 520 the Place Key, and using the Place Key can share 524 its spot, field value pairs and endpoint with other devices. Other devices in the place may get the endpoint from the constraint-based registry server 106 and then use the endpoint to access the Spot. It should be noted that in order for the endpoint to incorporate place specific information, the Spot endpoint might be sent to the constraint-based registry server 106 after the Place Key has been sent to the device.

Figure 6A:
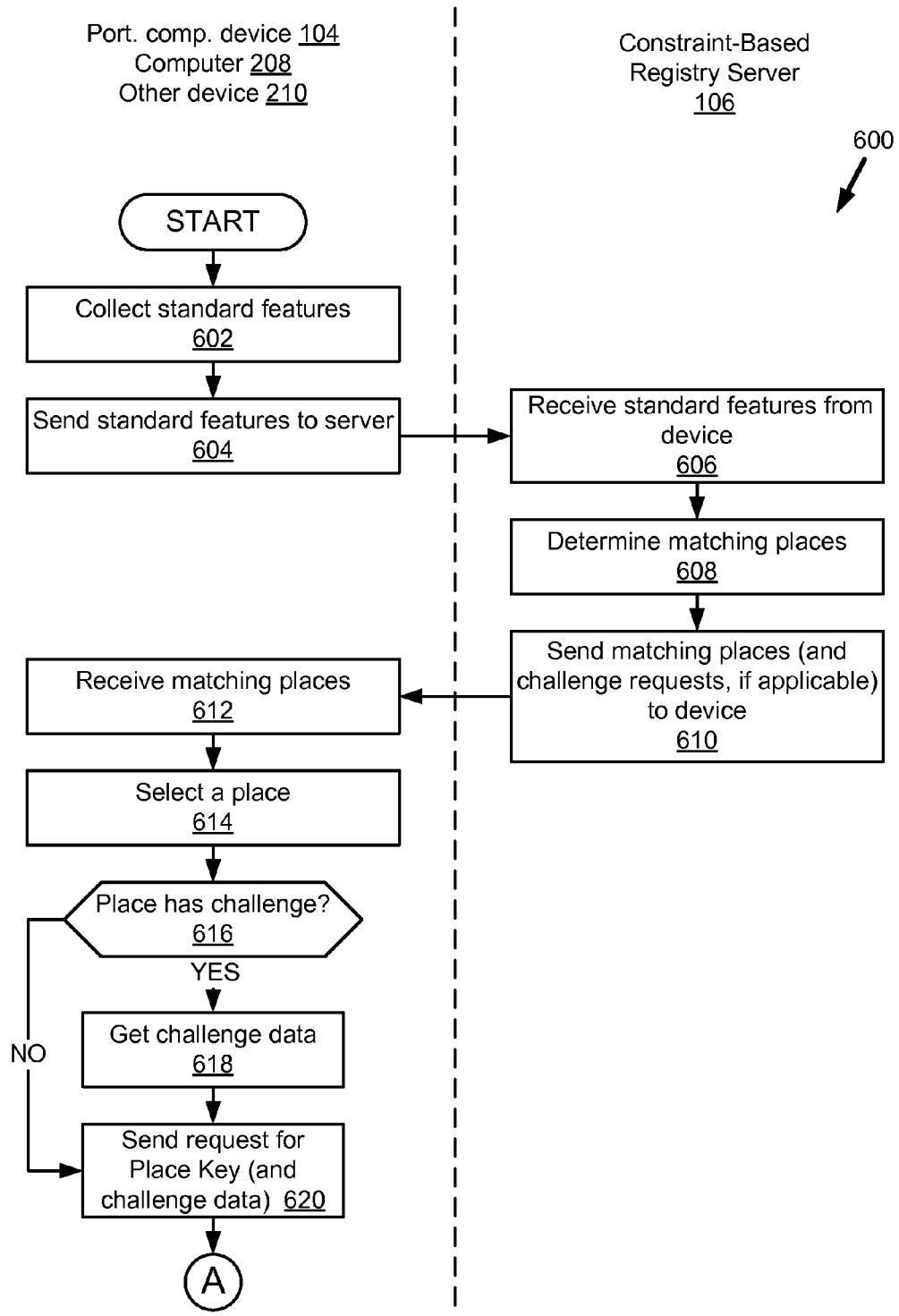
FIGS. 6A and 6B are a flow chart illustrating a method for generating and approving a challenge in accordance with the present invention.
Figure 6B:
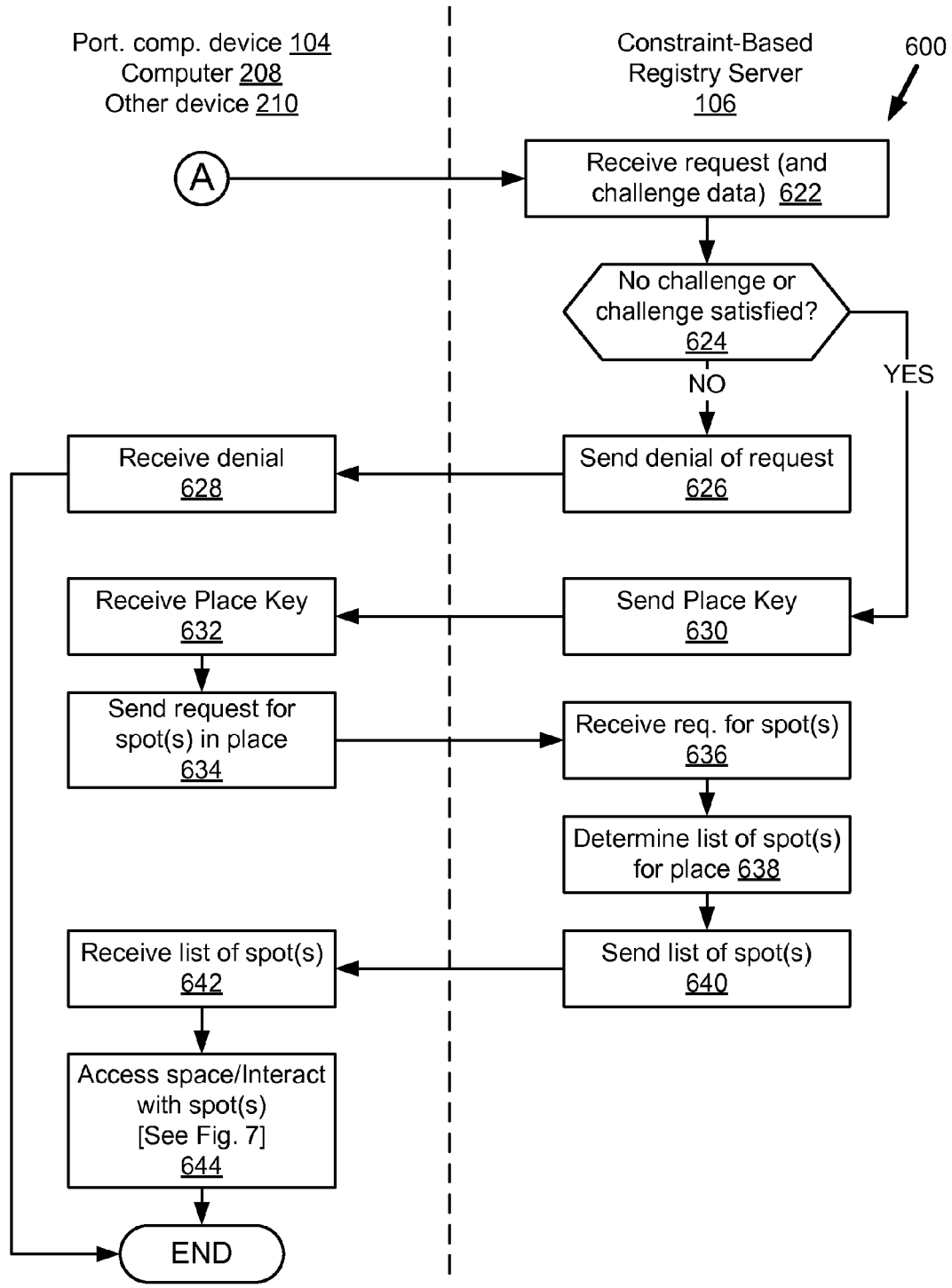

Referring now to FIGS. 6A and 6B, one embodiment of a method 600 for generating and approving a challenge in accordance with the present invention. The method 600 begins with the device 104 collecting 602 standard features. For example, the device 104 computes the values for a set of standard features, such as location, time, visible SSID's. In a more particular example, the GPS coordinates may be equal to x, y+/−50 yards, the visible WIFI spots include SSID1 and SSID2, and the ambient light level is between j lumens and k lumens. Then the device 104 sends 604 these values to the constraint-based registry server 106. The constraint-based registry server 106 receives 606 the standard features from the device 104; and then the constraint-based registry server 106 uses those values to determine 608 the set of possible matching places (e.g. those not ruled out by the received feature, value pairs). In one embodiment, the constraint-based registry server 106 provides an application interface for interacting with devices 104, 208 and 210. The constraint-based registry server 106 determines 608 which place constraints match these values and sends 610 the matching places and description for each matching set. The device receives 612 the matching places and selects 614 a place. Next the device 104 determines 616 whether the selected place has a challenge. If not, the method continues to step 620 as will be described below. However, if the place has a challenge, the device 104 retrieves 618 the challenge data. The constraint-based registry server 106 may have responded with a challenge or a list of additional fields, the values of which are necessary to determine complete matches—e.g. field names which are specified in the sets of constraints not ruled out by the received values. In such a case, the device 104 may be required to sample the local environment for transitory information, such as taking a picture of a displayed barcode, audio recording of ambient sounds or signals broadcast by other devices, etc. The device 104 responds with a request 620 for the Place Key and the challenge data (set of field value pairs corresponding to these field names). The constraints-based registry server 106 receives 622 the request (and challenge data). The constraint-based registry server 106 determines 624 whether the challenge was satisfied or whether there was not a challenge. If the challenge was not satisfied, the constraint-based registry server 106 sends 626 a denial of request, the denial of request is received 628 and the method is complete and ends. On the other hand, if the challenge was satisfied, the method sends 630 a Place Key. The device 104 receives 632 the Place Key and then uses the Place Key to request 634 spots in the place. The constraint-based registry server 106 receives 636 the request for spots corresponding to the Place Key, determines 638 a list of spots for the place and sends 640 the list of spots back to the device 104. The device 104 receives 642 the list of spots and can use this information to access 644 the space and interact with other spots. It should be noted that the device 104 can use one of the returned Place Keys to request the set of spots registered with that place and to register as a spot in the place. In one embodiment, the constraint-based registry server 106 requires that the device 104 register as a spot before it is allowed to see the list of other spots. In other embodiments, at least one spot is returned along with the Place Key.

In the case where a device 104 matches the constraints for several places, the ordering of the places (and associated information resources) as presented to the device 104 may depend on factors such as the popularity of a place or the spatial proximity between the devices 104 and other spots within the matched places. Below we describe in detail the method for determining the spatial relationship between spots in a given place. Once a device 104 has estimated the spatial relationship with other spots in the place, those estimates are used to order the display of the Spots. In particular, if there are several other spots in the Place that are in close spatial proximity, that might indicate, for example, a meeting and that place might appear at the top of the list presented to the user. Furthermore, the spatial relationship between spots can be used to guide the user of a portable computing device 104 towards direct physical interaction with other devices 104 (or owners of those devices) in a place. In addition to the meeting example, another example might be locating other device 210 (e.g., a printer that has a "fixed" location) and is a very popular spot within the place. This example also highlights that the historical trends in timelines of interaction might also be used to highlight various spots depending on variables such as the day of week, time of day, and the recent history of activity on or movement of the device 104.

It should be noted that when a device no longer meets the criterion for Place (or fails a challenge response) the Place Key may change which requires sending a new Place Key to all the registered spots via their registered endpoints along with the updated lists of spots that comprise the place. This could be done on a regular schedule (e.g. every 15 minutes, once an hour, etc.).

Devices 104 within a place use the registered endpoints to retrieve pins from other spots within the place using an application interface. This is simply a request made to the endpoint of one other spot to return a list of pins. Each pin is defined as a tuple containing a URL, description information, the originating spot, etc. (Note in the API that any spot can cache results from other spots—e.g. I don't need to ask all of the spots for pins to get a comprehensive list.)

As has been illustrated above by the method of FIGS. 6A and 6B, places may define a "Challenge" constraint which comprises field values that would only be accessible to devices within the physical location. As a simple example, a time varying, randomly generated image could be displayed on a screen located in a place. To join or prove membership in a place, a device would take a picture of image, use Visual Search to retrieve a secret code, and provide the result as the value of the "Visual Search" field. Analog signals, such as ambient light levels or audio samples could also be used within such a system by defining similarity metrics along with matching thresholds (or, more generally, any probabilistic matching technique). In addition to these approaches, devices within a place might also form a "trust network". For example, the device that registers and creates the private key for a place could also use that key to sign credentials corresponding to other devices in the place. The trusted device can be a projector, a power plug, a video conferencing system, an MFP, etc. Before signing off on the credentials for another device, the registering device might require some type of additional authentication information.

Using an attendance taking example, the instructor defines a "Class1 Place" corresponding to the classroom. This includes constraints such as "GPS coordinates within 200 feet of X, Y" where X, Y are the readings obtained from the instructor's device. The instructor's device also periodically samples the ambient light and sound levels and sends them to the constraint-based registry server 106 as constraints. This might be at regular intervals, e.g. each minute or in response to a request from the constraint-based registry server 106. (The instructor's device can provide a callback (e.g. an endpoint) to the constraint-based registry server 106 when defining the Place. The constraint-based registry server 106 calls this to obtain current constraints which correspond to Challenge/Response pairs.) A student's device contacts the constraint-based registry server 106 and sends GPS coordinates along with some other standard features (might include a device affiliation, e.g. "student of university ABC"). The constraint-based registry server 106 determines that the device meets a subset of the Class1 Place constraints and does not violate any of the constraints. The constraint-based registry server 106 then requests the device to sample light and sound levels and send the results to the constraint-based registry server 106. (The constraint-based registry server 106 might request the samples be taken at a precise time, for example 10 seconds starting on the minute and that specific feature values be calculated and sent to the constraint-based registry server 106 rather than the entire sample.) The constraint-based registry server 106 compares the response with the data obtained from the instructor's device. If the response is within a threshold of the instructor's device, then the constraint-based registry server 106 continues on to registering the device. Note that the constraint-based registry server 106 might initiate a challenge with the device at regular intervals, for example every 10 minutes depending on the constraints specified by the instructor's device.

Figure 7:
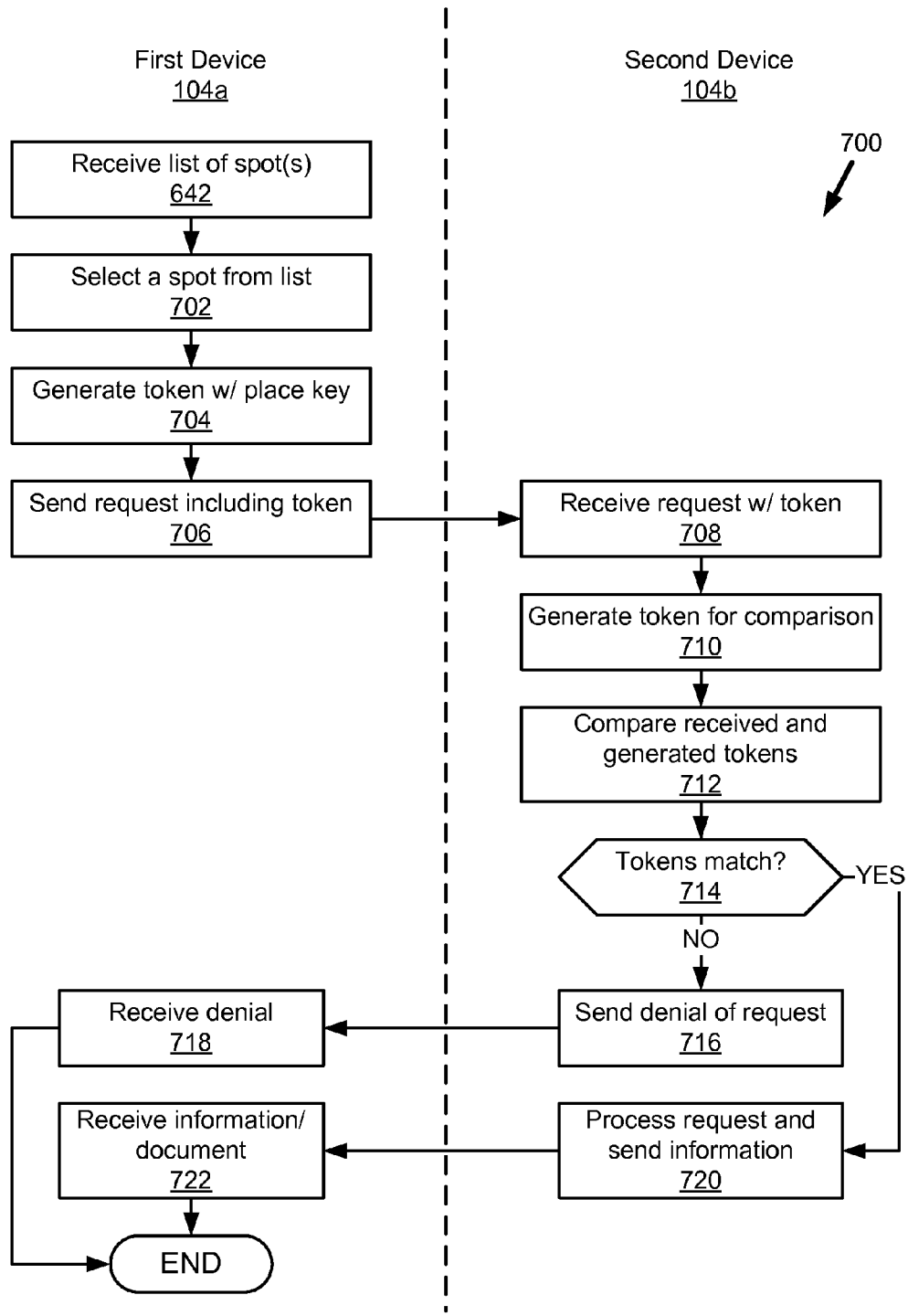
FIG. 7 is a flow chart of a method for direct communication or sharing of documents in accordance with the present invention.

Referring now to FIG. 7, a method 700 for direct communication or sharing of documents in accordance with the present invention will be described. The method 700 will be described in the context of sharing information or documents between a first device 104a and the second device 104b; however, those skilled in the art will recognize that this interaction could be between any device 104, 208 or 210, and could also be between one first device to a plurality of second devices or vice versa. The method begins with first device 104a receiving 642 a list of spots associated with a place. This is similar to steps 642 of FIG. 6B that has been described above. Next, the first device 104a selects 702 a spot from the list of spots for direct communication or sharing. Then the first device 104a, for example the spot communication module 334, generates 704 a token with the Place Key corresponding to the place. Then the first device 104a sends 706 a request for information or a document and the token to the second device 104b. The second device 104b receives 708 the request and the token, and then generates 710 its own token for comparison since it knows the Place Key. The received token and the generated token are compared 712 by the second device 104b. Then the second device 104b, for example using its spot creation module 334, determines 714 whether the tokens match. If the tokens do not match, the second device 104b sends 716 a denial of request, the first device 104a receives 718 the denial of request and the method is complete and ends. On the other hand, if the tokens match, the second device 104b processes the request and sends 720 the information or document requested to the first device 104b. The first device 104b receives 722 the information or a document and can utilize it as desired, after which the method is complete and ends. In alternate embodiments, the endpoints exchange keys so that the communication between them may be encrypted.

After registering in a place, a device 104 may communicate with the constraint-based registry server 106 to define operations for the constraint-based registry server 106 to execute when certain conditions within the Place are met. Below is a list of example conditions and associated operations: 1) when there are no more registered devices within the Place, notify the device by contacting a specified endpoint; 2) when a new device joins the place, notify the device by contacting a specific endpoint—this can be used, for example, setting reminders for yourself when you meet with certain people (i.e. their devices); or 3) when there is only one device left within the Place, add a new specified endpoint (e.g. a new set of pins)—such endpoints might, for example, correspond to "Virtual Spot" in the Place that includes the endpoints necessary to turn off the lights. A method for performing such actions is described below with reference to FIG. 8.

Figure 8:
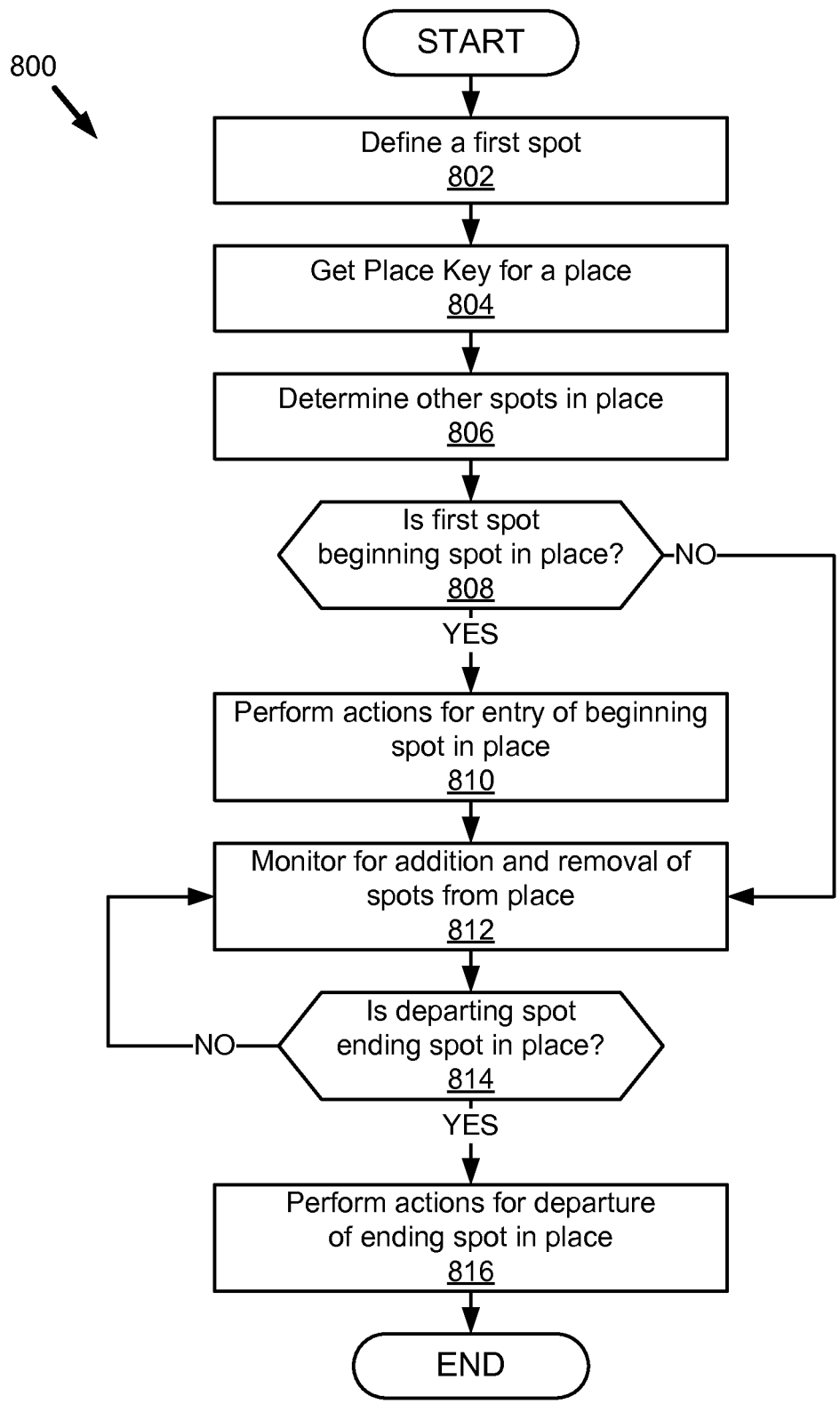
FIG. 8 is a flow chart of a method for performing an action based upon information space membership in accordance with the present invention.

FIG. 8 is a flow chart of a method 800 for performing an action based upon information space membership in accordance with the present invention. The method 800 begins by defining 802 to a first of spot. Then the method gets 804 a Place Key corresponding to a place. Next, the method determines 806 other spots in the place as has been described above with reference to FIG. 6B. The method determines 808 whether the first spot is a beginning spot in the place. In other words, the constraint-based registry server 106 determines whether the first spot is the only spot in the place. In one embodiment, the conditional actions associated with a Place are defined over the set of devices registered to a place along with the most recent addition or deletion to that set. For each place, the constraint-based registry server 106 maintains a set of currently registered devices. After making any change to this set, the constraint-based registry server 106 then checks each condition to see if it is satisfied by the current set of registered devices. If not, the method proceeds to step 812 as will be described below. However, if the first spot is the beginning spot for the space, the method performs 810 actions associated with creation of the beginning spot for that space. For example, activating a device such as projector, adjusting the heating or lighting for room, sending a meeting reminder to other devices or various other actions may be performed when a first spot enters a space. Next the method monitors 812 for the addition and removal of spots from the space. For example, this could be done by the spot action module 332 either at the portable computing device 104 or at the constraint-based registry server 106. In other embodiments, depending on detection of particular spots been added or removed from the place, particular actions corresponding to those spots may be taken. After step 812, the method continues to determine 814 whether a departing spot was the ending of last spot in the place. If not, the method returns to step 812 and continues to monitor for the addition or removal of spots from the place. On the other hand, if the departing spot is the last spot in the place, the method continues to step 816 and performs actions associated with the departure of the last spot in a place. Example actions for steps 810 or 816 include: requesting a URL (e.g. endpoint) that corresponds to the callback registered by the device that set the condition; creating a "Virtual Spot" and adding it to the set of devices; updating the constraints the define the Place; removing spots from the Place; controlling some other devices associated with the Place—such as turning the lights and heater on when a Place is created and turning them off when last spot (device) leaves a Place. Note that in addition to simply maintaining an identifier and endpoint for each spot, the constraint-based registry server 106 might maintain additional information, such as the type of spot. This type information could be used in defining a condition. For example, "Virtual Spots" might ignored by default for the purposes of matching conditions.

Once a spot is registered, it defines an endpoint that allows other devices within the Place to communicate with the corresponding device. (This communication may be directly with the device or indirectly with a proxy operating the endpoint on behalf of the device.) The constraint-based registry server 106 may use the defined endpoint and the API to determine whether or not a spot still meets the constraints defined by the Place. In one embodiment, the constraint-based registry server 106 uses the endpoint to issue a "Place Based Challenge." The spot replies with a response. The constraint-based registry server 106 compares the response with the constraints defining the Place. If the response does not match, the spot is removed from the Place which includes: removing the spot's endpoint from the set of endpoints comprising the Place; optionally using the endpoints of the remaining set of spots to notify them of the change; performing the methods listed above to see if the updated set of spots along with the most recent deletion matches any of the conditions/actions specified for this place.

Figure 9:
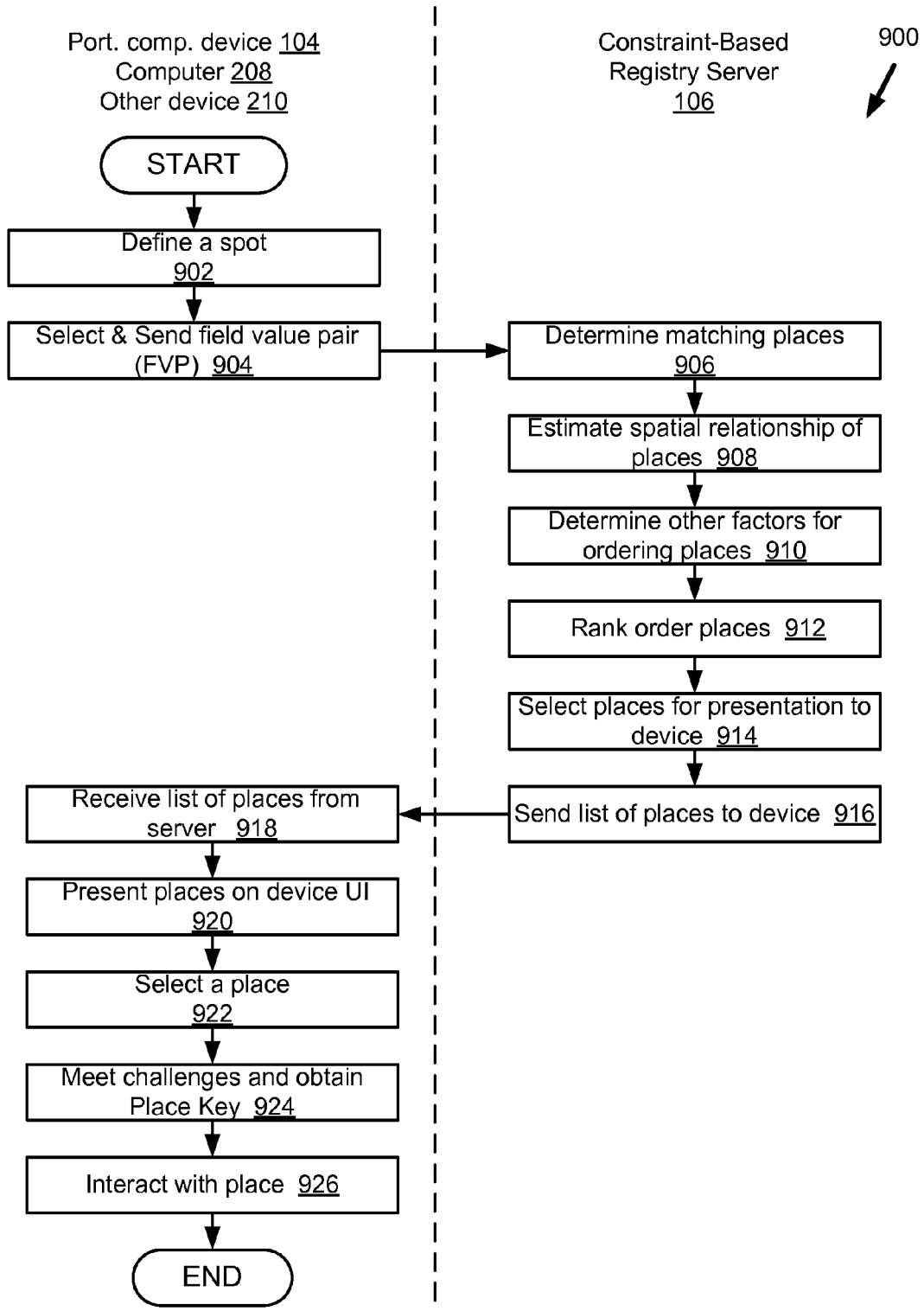
FIG. 9 is a flow chart of a method for searching for available places in accordance with the present invention.

Referring now to FIG. 9, one embodiment for a method 900 for searching for available places in accordance with the present invention will be described. The method 900 begins by defining 902 the spot, and selecting and sending 904 field value pairs for the spot from the portable computing device 104 to the constraint-based registry server 106. The constraint-based registry server 106 receives the spot and field value pairs, and determines 906 matching places. Since one device may satisfy constraints for multiple places simultaneously and would then be able to "see" (contact) spots in all those places, this method attempts to refine the number of places that the user enters. In some cases, a device (spot) can be presented with an option of which Place to join. In that case, the Places may need to be ranked. Ranking may depend on many different factors including the proximity of a device to the Place, preset choices, etc. Next, the method estimates 908 the spatial relationships of the places and also determines 910 other factors for ordering places. If the ranking is based on proximity, some sensors such as GPS may not provide information in sufficient location granularity. In that case, sensory information captured by other devices in nearby Places can be used to determine the suggested Places for the device. For this, captured ambient/sensory information is stored at the constraint-based registry server 106 along with time stamps, Places, and accuracy of the sensory information. A new device queries the constraint-based registry server 106 with the available sensory data. The method rank orders 912 the places. In one embodiment, a place matching score is computed based on accuracy, time, and the difference between the registered and measured sensory data. The returned Places are ranked based on this matching score. Then a predetermined number of places are selected 914 for presentation to the device 104. In many cases, the portable computing devices 104 have limited screen real estate and therefore, the number of places may be limited to the top five or fewer. Next the constraint-based registry server 106 sends 916 the list of places to the device 104. The device 104 receives 918 the list of places from the server 106. The received list is presented 920 to the user by the presentation module 328. The user selects 922 a Place or the top ranked place is selected automatically. The portable computing device 104 and the constraint-based registry server 106 cooperate to meet the challenges and obtain 924 a Place key, after which the portable computing device 104 can interact 926 with other spots in the Place as has been described above.

In addition to estimates of spatial relation, each spot may maintain its own ranking of pins (and implicitly other spots). These might correspond to the trust or relevance judged by the fact that the user of a device actually followed the link within a pin. This ordering would be used to rank the list of pins in response to a request. (Note the request might include keywords which would be used to filter the response pins.) An individual spot might use the rankings of several other spots in order to determine its own ranking for the pins. This ranking could be used when presenting the device user with the list of pins. Feedback from the user can be used to update the ranking.

Creating pins from applications running on the device. A "spot server" or other software module running on a device 104 can make available the ability to other applications the ability to create a "pin" within the current place. For example, a camera application might take a photo and then use a software interface to create a pin in the current place. To do this, the spot server exposes the following functions via a software interface:

Request list of current places (so user can choose appropriate place if there are more than 1)

Deposit descriptive information and data (e.g. image data URL) to the spot server. Recall that a pin contains only contextual information and metadata. In one embodiment, the application defining the pin first obtains or creates a URL corresponding to the underlying data and then uses that URL to define and deposit a pin. Alternatively, the spot server software interface may include an API that accepts data (e.g. image data) associated with the pin, store that data, assign a URL to the data for use within the pin, and cause that data to be served in response to a request for that URL.

Reply with the ID (URL) of the newly created pin (to be used for displaying to user, updating in future, etc.)

EXAMPLES

One example application of this invention enables is effortless document sharing among people who belong to the same project. The device that is sharing the information can publish an ambient signal, such as an audio signal, and all the devices that can pick up the signal can also get the project documents from that device. In one embodiment, all the devices and associated users are meeting together in a room. Even if a collaborator is joining the meeting via video conferencing, they can still access the document as long as they can pick up the ambient signal. No password, exchanging web links are required and Data stays behind the firewall. In another embodiment, one of the devices that defines a spot is a projector in a room, and other devices can upload documents to the Spot corresponding to the projector and the projector displays those documents such as a presentation. The spot of the projector can also receive parameters to control the projector (e.g., "show next page") from any other devices in the place and execute those commands or parameters. This method for determining relationships and setting up communication between devices is implemented by: a first device sending to the constraint-based registry server 106 a list of field: value pairs; the constraint-based registry server 106 responding with additional "Challenge" fields for potentially matching places; the first device sampling/sensing data from environment and using this to compute response; the first device sending list of field: value responsive to challenge; the constraint-based registry server 106 responding with at least one matching Place Key and one or more Spots (list of endpoints) and the first device sending a request to at least one endpoint. This method is particularly advantageous for a number of reasons. First, it does not require login and can be fully automated. Second, the set of constraints are dynamic and continually updating and the constraint-based registry server 106 can initiate a Place Based Challenge at any time to ensure device still meets constraints. Third, the challenge can be based on the device making an inquiry. For example challenge for a mobile device with temperature sensor may include measuring the temperature while challenge for a laptop may be composed of capturing audio only. And finally, registration requires a device 104 to provide SERVICES (e.g. endpoints) to accept communications—not just generate requests. This also enables server-less business information communication behind firewall.

Another application of this invention is the use of historical sensory information. Person A is attending a presentation in conference room X with her first device. First device samples the audio signature (for example some feature vectors used for speaker identification) from the room and sends this periodically to the constraint-based registry server 106, along with the GPS information. Person B with Device B would like to "check-in" to the same conference room, but the normal GPS signal is not accurate enough to identify the location as being conference room X. Device B sends the GPS information to the constraint-based registry server 106 along with the collected sensory information (speaker audio signature). Device B's audio signature closely matches to the audio information collected from the same place just a moment ago (given the GPS constraints), so Person B is presented with conference room X as the top place to check in. This method for ranking of Places, Spots and information (Pins) based on history of sensory information is implemented by: collecting and sending information from one or more devices send sensory information (such as audio, photo, temperature, GPS) along with estimated accuracy and Place information to the constraint-based registry server 106; maintaining the history of sensor data, accuracy, and place information with timestamps at the constraint-based registry server 106; querying the constraint-based registry server 106 with current sensory information and returning from the constraint-based registry server 106 a list of Places most likely to contain first device based on comparing the sensory information from first device to the historical sensory and spot data associated with the Places. This application is particularly advantageous because the history of sensory information from other devices is used for refining the place information.

Some other ways for Device/Spot based ranking include: the device 104 maintains list of pins associated with another spot; the device 104 merges ranking from other spots to create own ranking; the device 104 uses user interaction (e.g. clicking on a pin) to modify ranking; the device responds to pin requests using updated ranking; and the display of list of pins (or spots) based on ranking. This allows user interaction for determining local ranking, the sharing and aggregating of local rankings and dynamic generation of list of dynamically changing content without need for centralized index.

Yet another application of the invention is to for environmental and other controls. When a student enters the classroom his/her first device automatically creates a Place (which is the virtual classroom Place where students can access each other's information, share information, etc.). Creation of Place can be associated with turning on the lights, heater, projector etc. Similarly, when the last student leaves the Place, the Place can be terminated. Terminating the place can be associated with actions such as turning off the lights, heater, and projector. This application is implemented by a method for association actions with status of Places, is implemented by registering conditions and actions with the constraint-based registry server 106, the condition dependent on set that comprises a Place, modifying a set of spots and maintaining a most immediate change (e.g. last spot added or removed); checking checks conditions with the constraint-based registry server 106 and if a condition matches, executing action. The method can include creating a virtual spot or a callback to device. This application is particularly advantageous because it provides the ability to define "first or last device" in a spot and provide a corresponding set of user interface options without prior configuration of the device.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A method for creating a constraint-based relationship between a first device and a second device for interacting or sharing information, the method comprising:
   determining a constraint for the first device;
   creating a first spot for the first device by specifying a communication endpoint that represents a unique link to the first spot and that accepts and responds to a request from a second spot on behalf of the first device, the first spot being an application server;
   publishing the first spot to a registry server;
   receiving from the registry server information for a place having at least the second spot and defined by a set of constraints, the set of constraints for the place corresponding to the constraint for the first device;
   determining whether an environment sample received from the first device matches a challenge included in the information; and
   responsive to a match, using the received information to enable communication between the first device and the second device.

2. The method of claim 1, wherein determining the constraint for the first device includes:
   collecting a plurality of field value pairs;
   selecting one or more fields of the collected field value pairs; and
   identifying the communication endpoint.

3. The method of claim 2, wherein the first spot is created from the field value pairs and the communication endpoint.

4. The method of claim 1, wherein receiving the information for the place includes receiving a Place Key.

5. The method of claim 1, wherein receiving the information for the place includes:
   receiving a Place Key; and
   receiving a list of spots from the registry server.

6. The method of claim 1, wherein receiving the information for the place includes:
   receiving a plurality of matching places;
   selecting one of the plurality of matching places;
   determining whether the selected matching place requires a challenge; and
   collecting challenge data and sending the challenge data to the registry server to get access to the selected matching place that requires the challenge.

7. The method of claim 1, wherein using the received information to enable the communication between the first device and the second device comprises:
   generating a token using the received information;
   sending the token and a request for data from the first device to the second device; and
   receiving the data from the second device.

8. A method for providing information about places to enable interaction or communication between devices, the method comprising:
   receiving one or more constraint values from a first device;
   determining a place having similar constraint values;
   sending the information about the place to the first device;
   receiving a selection of the place;
   sending a list of spots associated with the place, the spots being application servers corresponding to the devices, each spot corresponding to a communication endpoint that represents a unique link to the respective spot and that accepts and responds to requests from other spots in the selected place;
   determining whether an environment sample received from the first device matches a challenge included in the information; and
   responsive to a match, using the information to enable the communication between the devices.

9. The method of claim 8, wherein sending the information about the place includes sending challenge information required for access to the place.

10. The method of claim 9, further comprising:
    receiving a challenge response from the first device;
    determining whether the challenge response matches constraints for the place; and
    sending a Place Key to the first device if the challenge response matches the constraints for the place.

11. The method of claim 8, further comprising:
    receiving spot information including a constraint;
    determining whether an existing place having a matching constraint exists;
    creating a new place if the existing place having the matching constraint does not exist; and
    sending the information about the existing place if the existing place having the matching constraint exists.

12. The method of claim 8, further comprising:
    receiving spot information including a constraint;
    publishing the spot; and
    storing information including the constraint for the spot.

13. The method of claim 8, wherein determining the place having similar constraint values includes identifying a plurality of places and wherein sending the information about the place includes:
    ordering the plurality of identified places into a list of places; and
    sending the list of places to the first device.

14. The method of claim 13, wherein ordering the plurality of identified places includes:
- estimating spatial relationships of the places;
- determining other factors for ordering the places; and
- ordering the places using the estimated spatial relationships and the other factors.

15. An apparatus for creating a constraint-based relationship for interacting or sharing information, the apparatus comprising:
- a constraint collection module for collecting constraint information for a device, the constraint collection module coupled to receive constraint values from one or more other devices, the constraint collection module adapted to output the constraint information;
- a query module coupled to the constraint collection module for receiving the constraint information, the query module adapted for communication with a registry server to send the constraint information and to retrieve place information for a place, the device associated with a spot in the place; and
- a processor for using the place information for interacting or communicating with other spots in the place responsive to a match, the processor coupled to the query module to receive the place information and to determine that an environment sample received from the device matches a challenge included in the place information, each of the other spots being an application server corresponding to a communication endpoint that represents a unique link to the respective spot and that accepts and responds to requests from the other spots in the place.

16. The apparatus of claim 15, wherein the place information includes a list including at least one spot, the at least one spot corresponding to another device.

17. The apparatus of claim 15, further comprising one from the group of:
- a spot action module that cooperates with the processor to perform actions in response to the requests from the other spots or to send the requests for performance of an action to the other spots; and
- a spot communication module that cooperates with the processor to send or receive information or documents to or from the other spots.

18. The apparatus of claim 15, further comprising a challenge creation module for creating a challenge having at least one field value pair of a constraint and a constraint value, the challenge creation module coupled to the constraint collection module to receive constraints and the constraint values for the device, the challenge creation module sending the created field value pair to the registry server.

19. The apparatus of claim 15, further comprising a challenge response module for responding to a challenge having at least one field value pair of a constraint and a constraint value, the challenge response module coupled to the constraint collection module to retrieve the constraint values for the device, the challenge response module sending the retrieved field value pair to the registry server.

20. The apparatus of claim 15, further comprising a spot creation module for creating a spot and spot information corresponding to the device, the spot creation module coupled to receive the constraint information from the constraint collection module, the spot creation module coupled for communication to send the spot and the spot information to the registry server.

* * * * *